(12) United States Patent
Sudol et al.

(10) Patent No.: US 11,181,416 B2
(45) Date of Patent: Nov. 23, 2021

(54) FOOD SCALE WITH ADJUSTABLE BRACKETS ON THE BOTTOM TO ENGAGE THE SIDES OF A CUTTING BOARD

(71) Applicants: Sylwester Sudol, Oxford, CT (US); Ireneusz Sudol, Ansonia, CT (US)

(72) Inventors: Sylwester Sudol, Oxford, CT (US); Ireneusz Sudol, Ansonia, CT (US)

(*) Notice: Subject to any disclaimer, the term of this patent is extended or adjusted under 35 U.S.C. 154(b) by 3 days.

(21) Appl. No.: 16/927,419

(22) Filed: Jul. 13, 2020

(65) Prior Publication Data

US 2021/0018357 A1 Jan. 21, 2021

Related U.S. Application Data

(60) Provisional application No. 62/874,542, filed on Jul. 16, 2019.

(51) Int. Cl.
| | |
|---|---|
| *G01G 21/22* | (2006.01) |
| *G01G 21/28* | (2006.01) |
| *G01G 19/52* | (2006.01) |
| *A47J 47/00* | (2006.01) |
| *G01G 23/14* | (2006.01) |
| *G01G 19/00* | (2006.01) |

(52) U.S. Cl.
CPC ............ *G01G 21/28* (2013.01); *A47J 47/005* (2013.01); *G01G 19/00* (2013.01); *G01G 19/52* (2013.01); *G01G 21/22* (2013.01); *G01G 23/14* (2013.01)

(58) Field of Classification Search
CPC ....... A47J 47/005; G01G 19/00; G01G 19/52; G01G 21/22; G01G 21/28; G01G 23/15; B65D 25/20; B65D 25/22; B65D 25/24
See application file for complete search history.

(56) References Cited

U.S. PATENT DOCUMENTS

| | | | | |
|---|---|---|---|---|
| 4,106,735 A | * | 8/1978 | Partain | ...................... B60P 7/12 |
| | | | | 211/43 |
| 4,768,264 A | * | 9/1988 | Kunna | ..................... A47J 36/06 |
| | | | | 24/522 |
| 4,934,469 A | * | 6/1990 | Jackson | ................. G01G 19/44 |
| | | | | 177/244 |
| 5,637,838 A | | 6/1997 | Arey | |
| 6,359,239 B1 | | 3/2002 | Missler | |
| 7,252,255 B2 | | 8/2007 | Cornfield | |
| 9,163,979 B2 | * | 10/2015 | Taylor | ...................... B65B 1/32 |

(Continued)

FOREIGN PATENT DOCUMENTS

| | | |
|---|---|---|
| CN | 203042001 U | 7/2013 |
| CN | 2047976 U | 11/2015 |

(Continued)

*Primary Examiner* — Randy W Gibson
(74) *Attorney, Agent, or Firm* — Michael A. Blake

(57) ABSTRACT

A food scale comprising: a weighing surface; a bottom surface on a side of the scale opposite the weighing surface; a first bracket adjustably attachable to the bottom surface, the first bracket comprising a first lip that extends away from the bottom surface; a second bracket adjustably attachable to the bottom surface, the second bracket comprising a second lip that extends away from the bottom surface; where the first and second lips are configured to line up with and abut the sides of a cutting board when the food scale is placed on the cutting board, with the weighing surface facing upward.

13 Claims, 5 Drawing Sheets

(56) References Cited

U.S. PATENT DOCUMENTS

| | | | | |
|---|---|---|---|---|
| 9,188,476 B2* | 11/2015 | Volker | ................... | G01G 21/22 |
| 9,395,234 B2* | 7/2016 | Cosentino | .............. | G01G 19/44 |
| D838,200 S | 1/2019 | Li | | |
| 2015/0014068 A1* | 1/2015 | Volker | ................... | G01G 17/04 |
| | | | | 177/45 |
| 2016/0374516 A1* | 12/2016 | Lammel | ................. | F21V 23/04 |
| | | | | 269/11 |

FOREIGN PATENT DOCUMENTS

| | | |
|---|---|---|
| CN | 105595877 A | 5/2016 |
| CN | 206114084 U | 4/2017 |

* cited by examiner

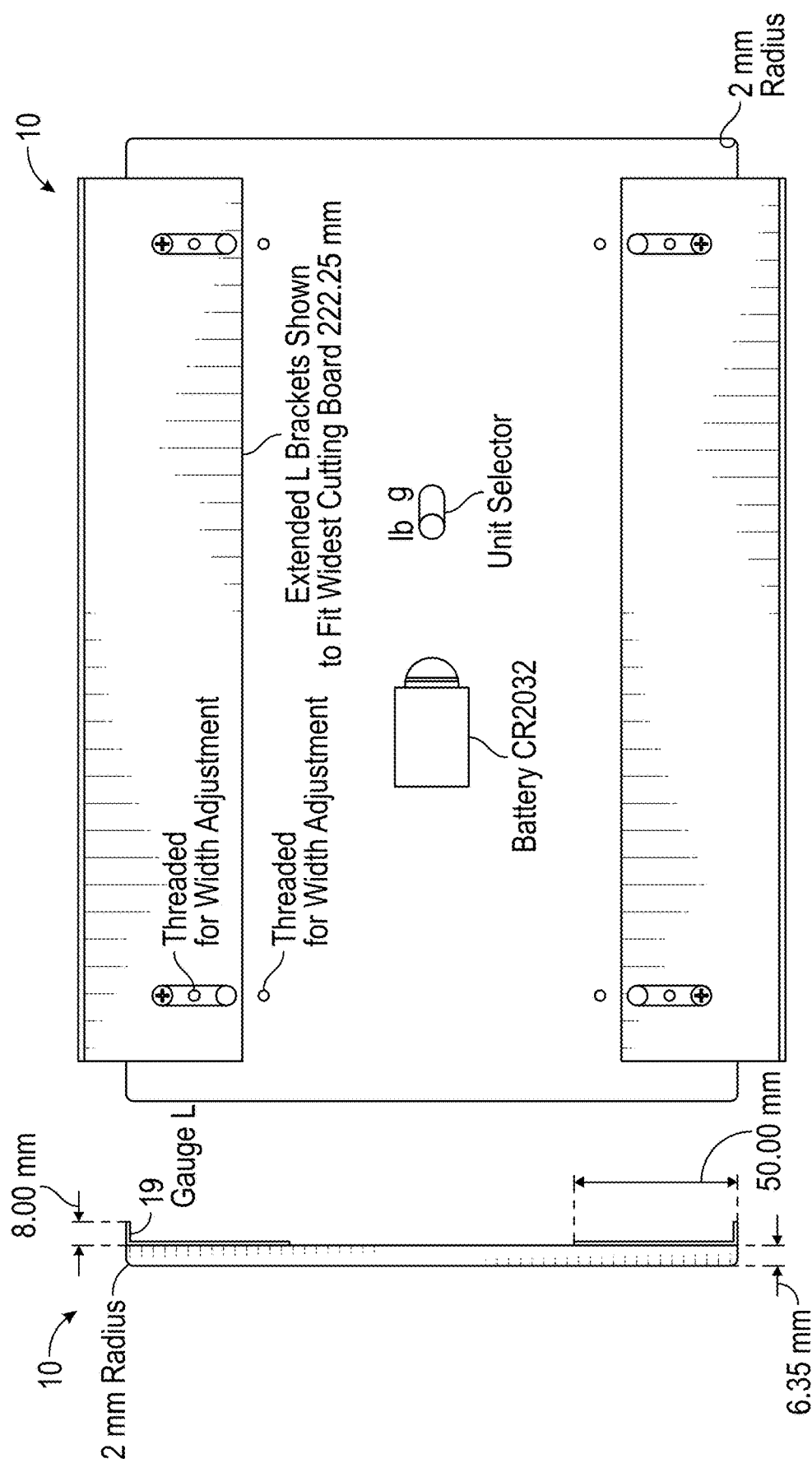

FOOD SCALE WITH ADJUSTABLE BRACKETS ON THE BOTTOM TO ENGAGE THE SIDES OF A CUTTING BOARD

CROSS-REFERENCES

This patent application claims priority to provisional patent application No. 62/874,542 filed on Jul. 16, 2019, by Sylwester Sudol and Ireneusz Sudol, and titled: "FOOD SCALE" which provisional application is fully incorporated by reference herein.

TECHNICAL FIELD

The present invention is an improvement to food scales, and more particularly is an inline portioning scale with brackets.

BACKGROUND

There is a very serious over portioning problem within the food services industry especially among deli style/front counter operations where food is portioned visually right in front of the customer. Food cost is a single biggest expense to any food operation and adhering to proper portioning formulas ensures financial viability of these establishments. It is estimated that an average outlet with 500K in annual sales loses about $5,000 per year due to over portioning. There are two prevalent methods used in the industry to prevent over portioning as of today. One is to pre portion certain foods in the kitchen prior to serving which adds substantial amount of labor hours on daily basis. This has draconian effect on any food business especially in areas with high minimum wage. The other method employs visual portioning in front of the customer which employs specific utensils such as thongs, scoops, spoons, etc. This method leads to gross over portioning and lost profits. It also can create knee jerk reactions where management discovers serious over portioning, reprimands staff, which in turn leads to serious under portioning issue thus creating customer dissatisfaction and lost future sales.

Typical food scales have multiple units of measure leading to employee mistakes by selecting wrong unit of measure.

Thus there is a need for a food scale that overcomes the above listed and other disadvantages.

SUMMARY OF THE INVENTION

The invention relates to a food scale comprising: a weighing surface; a bottom surface on a side of the scale opposite the weighing surface; a first bracket adjustably attachable to the bottom surface, the first bracket comprising a first lip that extends away from the bottom surface; a second bracket adjustably attachable to the bottom surface, the second bracket comprising a second lip that extends away from the bottom surface; where the first and second lips are configured to line up with and abut the sides of a cutting board when the food scale is placed on the cutting board, with the weighing surface facing upward.

BRIEF DESCRIPTION OF THE DRAWINGS

The present disclosure will be better understood by those skilled in the pertinent art by referencing the accompanying drawings, where like elements are numbered alike in the several figures, in which:

FIG. 6 is a side view of another embodiment of the scale;
and
FIG. 7 is a bottom view of another embodiment of the scale.

DETAILED DESCRIPTION OF THE INVENTION

Figure 1:
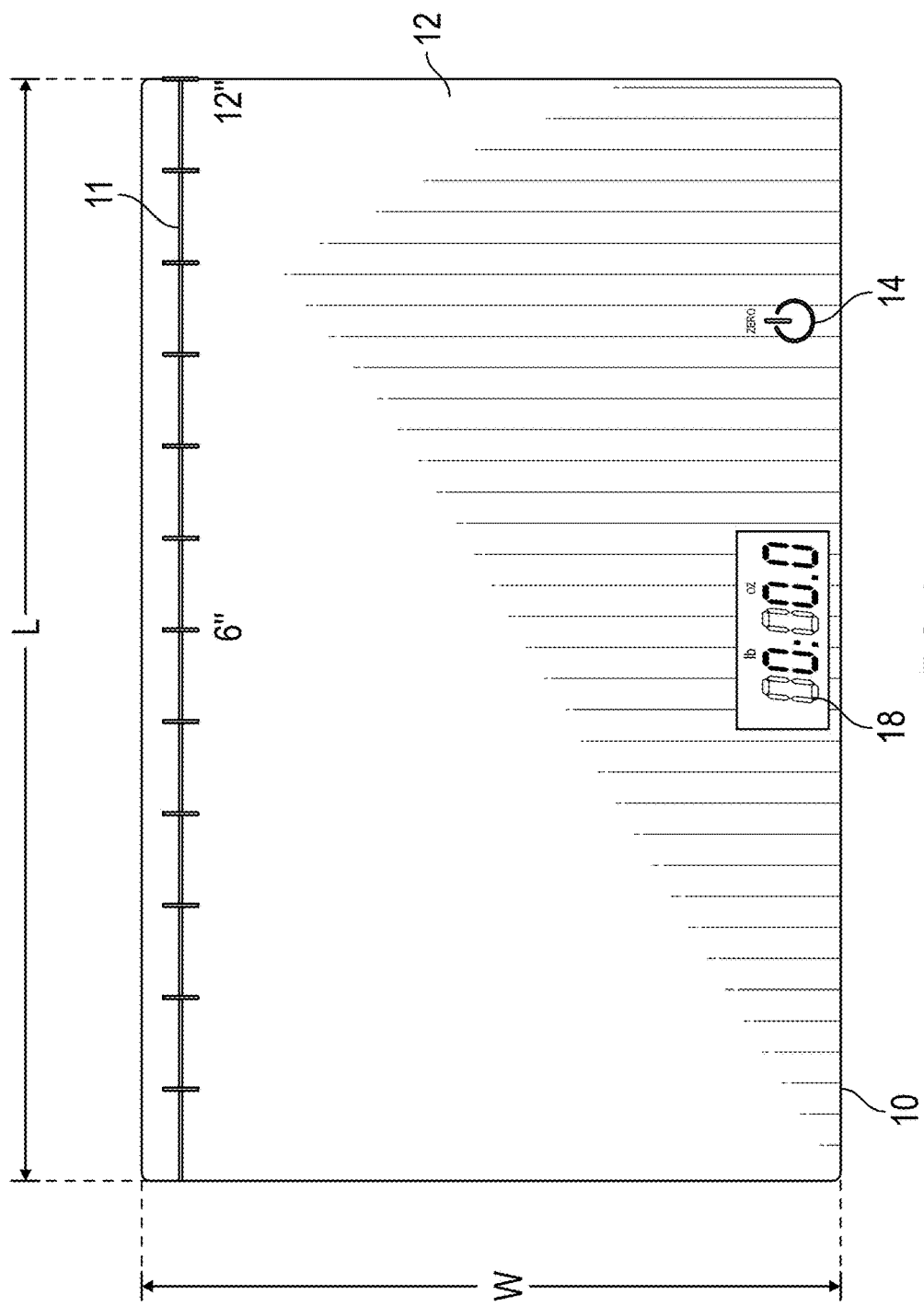
FIG. 1 is a top view of a disclosed scale.

FIG. 1 is a top view of one embodiment of the disclosed food scale 10. The food scale 10 is configured to weigh the meat, protein, and/or other toppings that will be put on a sandwich or otherwise served to a customer. The scale 10 will have a weighing surface 12, an on/off switch 14, and a display 18. The on/off switch may also have a taring option, that is the option to set the scale to zero ("0"). The scale 10 will have a length L and a width W. In one embodiment, the length L will be exactly 12 inches, so as to allow the user to show the customer that the sandwich is a foot long sandwich. In other embodiments, there may be a marking 11 on the scale surface to show that the sandwich is 6" or 12" or any other desired length, and in any desired unit of measurement. In still other embodiments, the length L may be any suitable length desired by the manufacturer, and may range from 10 to 14 inches, or may range to different lengths. In one embodiment the width W may be about 7.6 inches. In still other embodiments, the width W may be any suitable width desired by the manufacturer.

Figure 2:
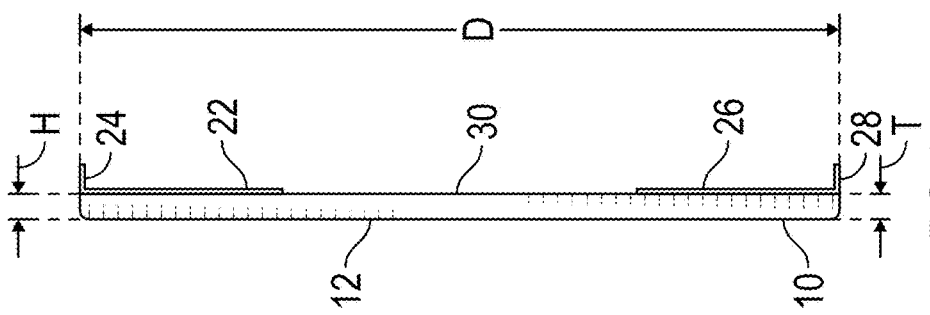
FIG. 2 is a side view of the scale.

FIG. 2 is side view of the food scale 10. A first bracket 22 is attached to one side of the scale 10. The first bracket 22 will have a lip 24 that extends down from the bottom surface 30 of the scale 10. A second bracket 26 is attached to an opposite side of the scale. The second bracket 26 also has a lip 28 that extends down from the bottom surface 30 of the scale 10. The lips 24, 28 of the brackets are configured to line up with and abut the sides of a cutting board used in the restaurant. The distance D between the lips may be about 7.6 inches in one embodiment. Generally the distance D should be the proper distance to allow the scale 10 to allow the lips 24, 28 to slide onto and abut a cutting board in the user's restaurant or home. The scale may have a thickness T. The lips 24, 28 have a height H. In one embodiment, the thickness T may be about 0.25" and the height H may be about 0.3".

Figure 3:
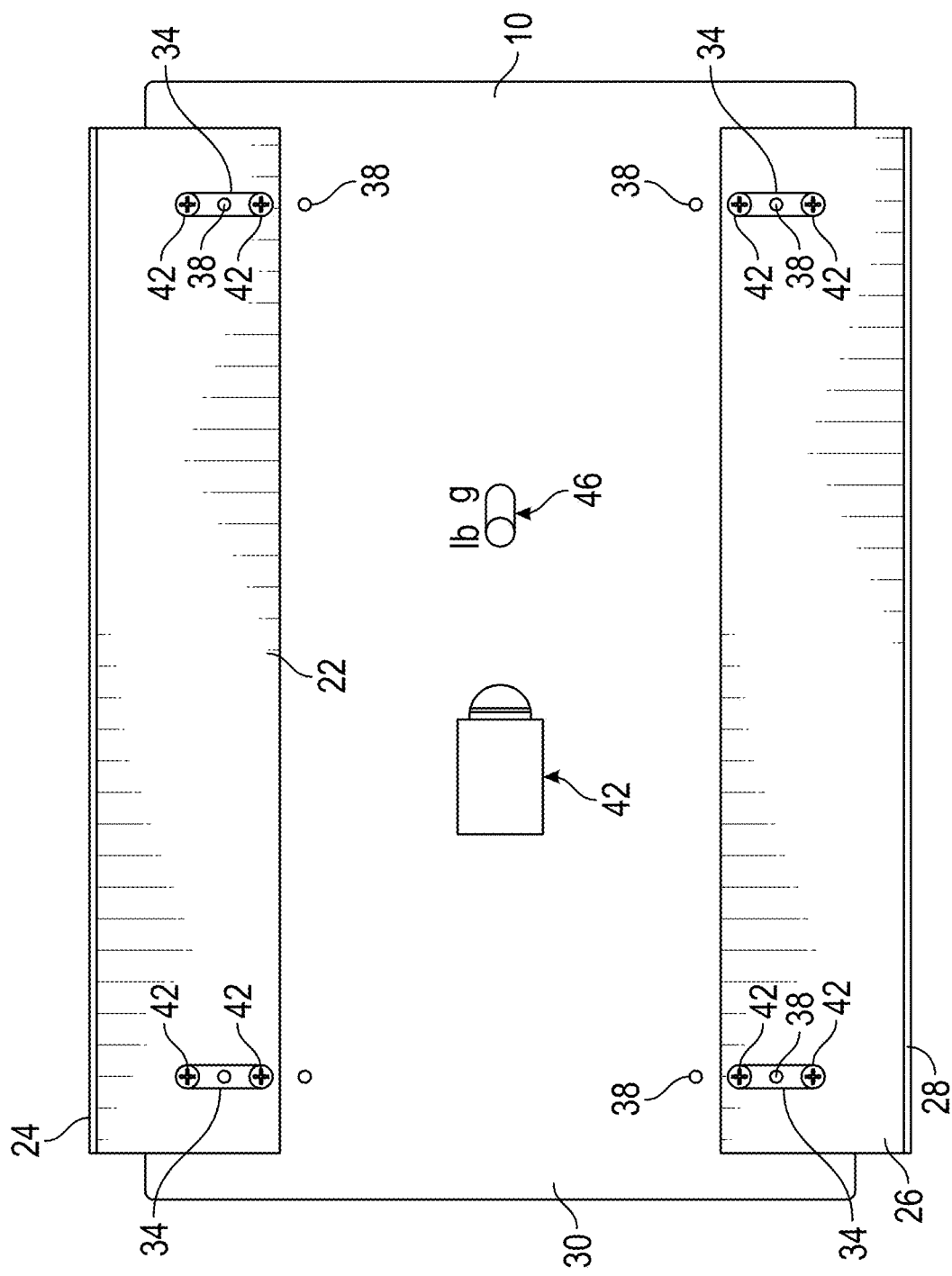
FIG. 3 is a bottom view of the scale.

FIG. 3 is a bottom view of the food scale from FIGS. 1 and 2. In this view, each bracket 22, 26 may have two slots 34. The bottom surface 30 may have several threaded screw holes 38. Depending on the placement of the brackets with respect to the screw holes, at least one or more of the screw holes are configured to line up with slots 34, to allow one to adjust the position of the brackets 22, 26 so that the brackets 22, 26 can be moved to fit cutting boards of various widths. With respect to each slot, 34, two screws 42 may be screwed into the screw holes 38. The shown brackets and slots are capable of being adjusted to fit onto a cutting board of about 6 inches to about 8.75 inches in width. In other embodiments, the bracket and scale can be configured to fit cutting boards of a variety of widths. The scale 10 has a battery 42 located on the lower surface 30. In addition, there is a unit selector 46. The unit selector allows the user to switch the display 18 units from pounds to grams, and grams to pounds. In other embodiments, other units of measurement may be used for the unit selector 46.

Figure 4:
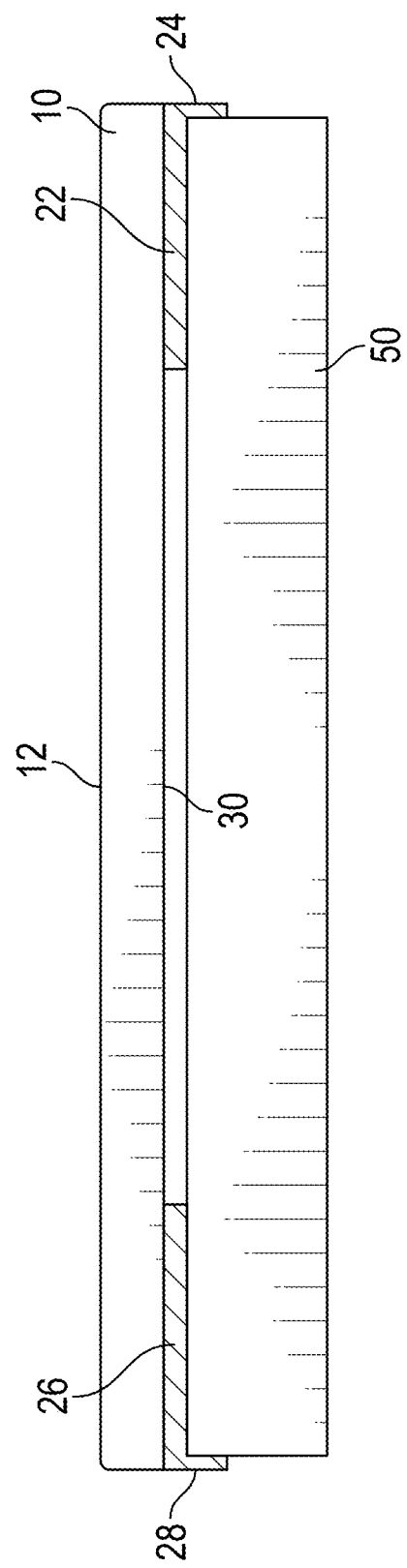
FIG. 4 is a side view of the scale slideably attached to a cutting board.

FIG. 4 is a side view of the scale 10 placed on a cutting board 50. The lips 24, 28 of the brackets 22, 26 are shown abutting the cutting board 50, and generally keeping the scale 10 in place on the cutting board 50. However, the lips 24, 28 are not generally tightly abutting the cutting board 50, but rather may be loose enough to keep the scale 10 in place, while allowing a user to slide the scale 10 along the length of the cutting board 50. The length dimension of the cutting board 50 goes into the page.

Figure 5:
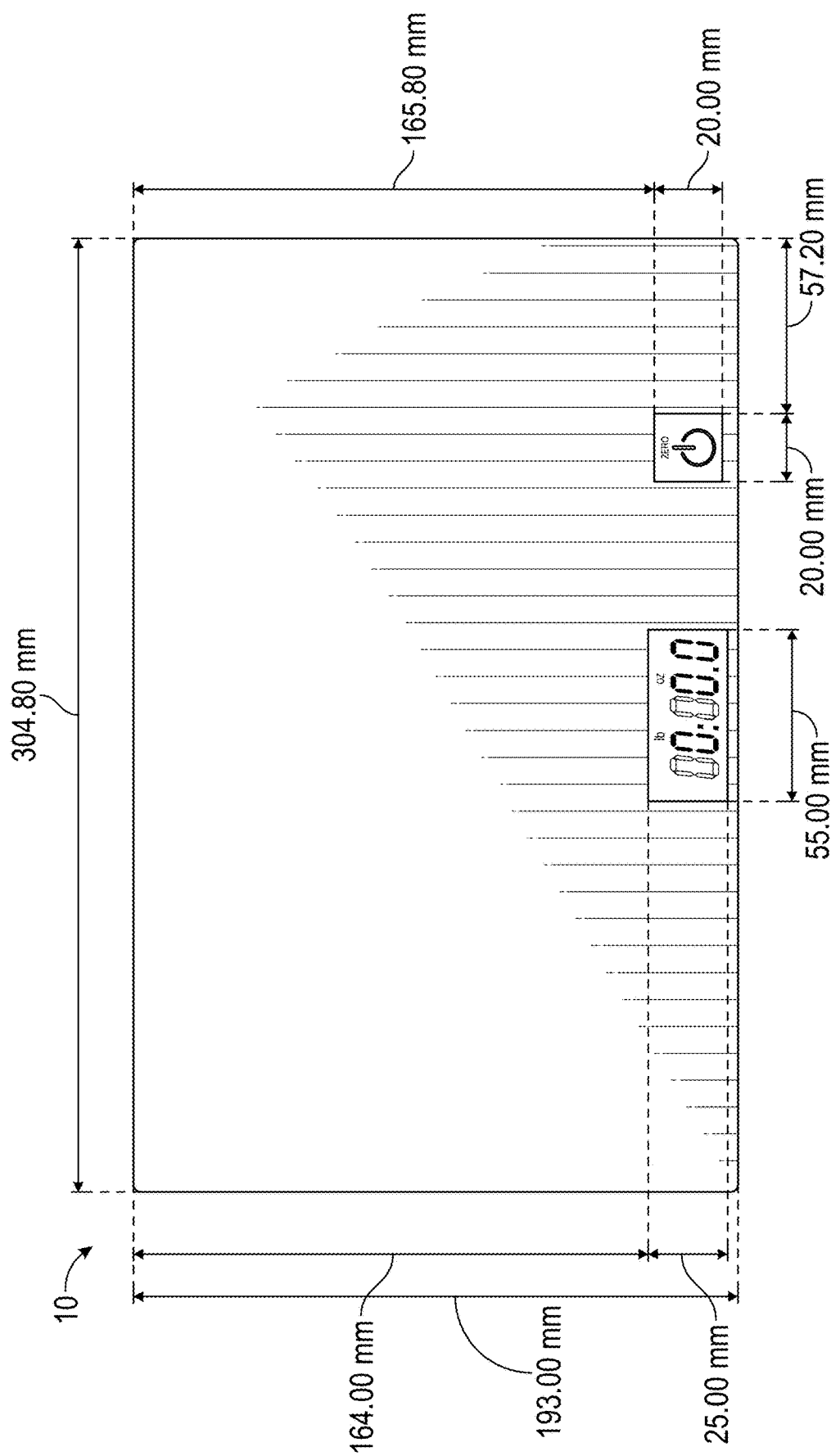
FIG. 5 is a top view of a another embodiment of the scale.

FIG. 5 is a top view of one embodiment of the food scale 10. In this figure, dimensions for one embodiment of the food scale 10 are shown.

FIG. 6 is a side view of the food scale 10 from FIG. 5. In this figure, dimensions for one embodiment of the food scale 10 are shown.

FIG. 7 is a bottom view of the food scale from FIG. 5. In this figure, dimensions for one embodiment of the food scale 10 are shown. One of ordinary skill in the art will recognize that other dimensions may be used for the scale, depending on the needs of the end user.

In one embodiment of use of the food scale, the scale will be placed onto a cutting board. The lips of the brackets will abut the sides of the cutting board, allowing the scale to lay flat on the cutting board, while also allowing the scale to slide along the length of the cutting board with the lips abutting the sides of the cutting board. The brackets may be adjusted by using the slots, screws, and screw holes, so that the lips may abut different sized cutting boards. A user may place bread, flatbread, or a wrap on the scale. If the scale is 12 inches in length, the user may show a customer that the bread, flatbread or wrap is the same length as the scale, and therefore is a foot long (or ½ of a foot). Once the bread or wrap is on the scale, the user may tare the scale, i.e. the scale will read zero ("0") with the bread or wrap on the scale, so that the weight of the meat, protein or toppings will show on the display when the meat, protein or toppings are placed on the scale. Once the proper amount by weight of meat, protein, and/or toppings or placed on the scale, the user can show the customer that the proper amount of meat, protein, and/or toppings were placed on the sandwich.

The disclosed scale has many advantages. The disclosed scale was specifically designed to be used in front counter operations where food is prepared right in front to the customer. The low profile scale is unobtrusive and it doesn't create negative impression in the mind of the customer. The dimensions of the scale, especially being 12 inches length in one embodiment, was designed specifically to deal with hoagie/submarine style sandwiches. This specific length ensures that the weight of protein or any product is distributed evenly across the carrier. The carrier may be bread, wrap, flatbread, or a dish or container to hold protein and/or toppings. The display may be mounted in the specific location to be visible to the customer and so the display will not get covered by the carrier or deli paper. The scale may have only two units of measure, ounces and grams. The scale may have a switch on the bottom allowing for selection of pounds, ounces, or grams. The brackets that hold the scale in place allow for the scale to be moved along the length of the cutting boards allowing for placement flexibility and ensuring that the scale does not fall off the line. Adjustability of brackets allows for the scale to be mounted on the cutting boards of varying widths. The scale with brackets may be used in any type of food establishment where food is primarily prepared in front of the customer in an assembly line type of operation. The scale allows for precise measurement of the product being sold, ensuring proper portioning and aiding in sustainability of specific calorie claims. The scale with brackets may be mounted on the cutting board at the point of order. It could be mounted anywhere on the line where measuring is needed and multiple scales could be used at different points of assembly. Typically the carrier such as bread, wrap, flatbread, or container is placed on the scale. The weight of the carrier is tared to zero and the carrier gets loaded with desired/prescribed amount of protein or other product. The scale can also be used with microwaveable or oven safe dishes that allow for heating of the product. The dish such as silicone tray is placed on the scale, tared to zero, and loaded with desired/prescribed amount of protein or other product.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A food scale comprising:
   a weighing surface;
   a bottom surface on a side of the scale opposite the weighing surface;
   a first bracket adjustably attachable to the bottom surface, the first bracket comprising a first lip that extends away from the bottom surface;
   a second bracket adjustably attachable to the bottom surface, the second bracket comprising a second lip that extends away from the bottom surface;
   wherein the first and second lips are configured to line up with and abut the sides of a cutting board when the food scale is placed on the cutting board, with the weighing surface facing upward.

2. The food scale of claim 1, the food scale further comprising:
   a first slot located on the first bracket at a first end of the first bracket;
   a second slot located on the first bracket at a second end of the first bracket, the second slot parallel to the first slot;
   a third slot located on the second bracket at a first end of the second bracket;
   a fourth slot located on the second bracket at a second end of the second bracket, the fourth slot parallel to the third slot;
   a first set of a plurality of threaded holes located on the bottom surface, the first set of the plurality of threaded holes are associated with the first slot;
   a second set of a plurality of threaded holes located on the bottom surface, the second set of the plurality of threaded holes are associated with the second slot;

a third set of a plurality of threaded holes located on the bottom surface, the third set of the plurality of threaded holes are associated with the third slot;

a fourth set of a plurality of threaded holes located on the bottom surface, the fourth set of the plurality of threaded holes are associated with the fourth slot;

wherein the distance between the first lip and second lip can be adjusted depending upon which of at least one hole of the first set of the plurality of threaded holes the first slot is lined up with a screw screwed into the at least one hole to attach the first bracket to the at least one hole, which of at least one hole of the second set of the plurality of threaded holes the second slot is lined up with a screw screwed into the at least one hole to attach the first bracket to the at least one hole, which of at least one hole of the third set of the plurality of threaded holes the third slot is lined up with a screw screwed into the at least one hole to attach the second bracket to the at least one hole, which of at least one hole of the fourth set of the plurality of threaded holes the fourth slot is lined up with a screw screwed into the at least one hole to attach the second bracket to the at least one hole.

3. The food scale of claim 2, wherein each set of the plurality of holes comprises four holes, and each slot is attached to the bottom surface via two holes of each set of the plurality of holes.

4. The food scale of claim 2, further comprising a switch located on the bottom surface, the switch configured to set the units of measurement to either metric units or imperial units.

5. The food scale of claim 2, wherein the switch is configured to set the units of measurement to either pounds or grams.

6. The food scale of claim 2, wherein the switch is configured to set the units of measurement to either ounces or grams.

7. The food scale of claim 1, further comprising a display on the weighing surface, the display configured to display the weight measured.

8. The food scale of claim 1, further comprising an on/off switch configured to also tare the scale.

9. The food scale of claim 1, further comprising markings showing at least one length.

10. The food scale of claim 9, wherein the length is 12 inches or 1 foot.

11. The food scale of claim 9, wherein the length is 6 inches or ½ foot.

12. The food scale of claim 9, wherein the length shown is 12 inches and 6 inches.

13. The food scale of claim 1, wherein the length of the food scale is 12 inches.

* * * * *